US009074681B2

(12) United States Patent
Hanlon et al.

(10) Patent No.: US 9,074,681 B2
(45) Date of Patent: Jul. 7, 2015

(54) HARDENED SILVER COATED JOURNAL BEARING SURFACES AND METHOD

(71) Applicant: United Technologies Corporation, Hartford, CT (US)

(72) Inventors: Thomas R. Hanlon, Colchester, CT (US); William P. Ogden, Glastonbury, CT (US); Eli N. Ross, Vernon, CT (US)

(73) Assignee: United Technologies Corporation, Hartford, CT (US)

(*) Notice: Subject to any disclaimer, the term of this patent is extended or adjusted under 35 U.S.C. 154(b) by 184 days.

(21) Appl. No.: 13/682,006

(22) Filed: Nov. 20, 2012

(65) Prior Publication Data

US 2014/0141929 A1     May 22, 2014

(51) Int. Cl.
*F16H 55/06* (2006.01)
*C25D 5/18* (2006.01)
*C25D 3/46* (2006.01)
*F16C 33/12* (2006.01)
*C25D 3/64* (2006.01)
*C25D 5/10* (2006.01)
*C25D 11/02* (2006.01)

(52) U.S. Cl.
CPC ...... *F16H 55/06* (2013.01); *C25D 5/18* (2013.01); *Y10T 428/12896* (2015.01); *Y10T 74/19949* (2015.01); *F16C 33/121* (2013.01); *C25D 3/64* (2013.01); *C25D 5/10* (2013.01); *C25D 11/02* (2013.01)

(58) Field of Classification Search
None
See application file for complete search history.

(56) References Cited

U.S. PATENT DOCUMENTS

| | | | | |
|---|---|---|---|---|
| 2,555,375 A | * | 6/1951 | Ruemmler | 205/238 |
| 2,735,808 A | * | 2/1956 | Greenspan | 205/263 |
| 2,801,375 A | * | 7/1957 | Losco | 257/763 |
| 4,161,403 A | * | 7/1979 | Shibata | 148/431 |
| 4,678,722 A | * | 7/1987 | Cohen | 428/642 |
| 5,209,578 A | | 5/1993 | Eastham et al. | |
| 5,685,797 A | | 11/1997 | Barnsby et al. | |
| 6,062,836 A | * | 5/2000 | Julicher et al. | 418/77 |
| 6,159,348 A | | 12/2000 | Barnsby et al. | |
| 6,223,616 B1 | | 5/2001 | Sheridan | |
| 6,588,934 B2 | | 7/2003 | Law | |
| 6,589,298 B1 | | 7/2003 | Limoges et al. | |
| 6,802,917 B1 | | 10/2004 | Tomantschger et al. | |
| 6,964,155 B2 | | 11/2005 | McCune et al. | |
| 7,021,042 B2 | | 4/2006 | Law | |
| 7,281,853 B2 | | 10/2007 | Duong | |
| 7,591,754 B2 | | 9/2009 | Duong et al. | |
| 7,824,305 B2 | | 11/2010 | Duong et al. | |

(Continued)

FOREIGN PATENT DOCUMENTS

| | | | |
|---|---|---|---|
| GB | 1014270 | * | 12/1965 |
| GB | 1269205 | * | 4/1972 |
| GB | 2097376 | * | 11/1982 |
| JP | 55-2745 | * | 1/1982 |
| JP | H11269580 A | | 10/1999 |
| JP | 2003322152 A | | 11/2003 |
| JP | 2004-263290 | * | 9/2004 |
| JP | 2009-79250 | * | 4/2009 |

OTHER PUBLICATIONS

International Search Report and Written Opinion, dated Feb. 27, 2014, for PCT Application No. PCT/US2013/070796, 14 pages.

*Primary Examiner* — John J Zimmerman
(74) *Attorney, Agent, or Firm* — Kinney & Lange, P.A.

(57) ABSTRACT

An article comprises a metal alloy substrate and a plated wear interface layer disposed over a surface of the metal alloy substrate. The wear interface layer has a chemical composition including between about 0.005 wt % and about 0.050 wt % of antimony (Sb), and the balance silver (Ag) and incidental impurities.

20 Claims, 4 Drawing Sheets

(56) References Cited

U.S. PATENT DOCUMENTS

| | | |
|---|---|---|
| 7,926,260 B2 | 4/2011 | Sheridan et al. |
| 8,172,716 B2 | 5/2012 | McCune |
| 8,205,432 B2 | 6/2012 | Sheridan |
| 2006/0104853 A1* | 5/2006 | Tauchi et al. ............ 420/501 |
| 2007/0020139 A1* | 1/2007 | Tauchi et al. ............ 420/501 |
| 2007/0269151 A1 | 11/2007 | Nardi et al. |
| 2012/0121923 A1 | 5/2012 | Palumbo et al. |
| 2012/0237789 A1 | 9/2012 | Wang et al. |

* cited by examiner

HARDENED SILVER COATED JOURNAL BEARING SURFACES AND METHOD

BACKGROUND

The described subject matter relates to turbine engines, and more particularly, to wear interface surfaces for use in turbine engines.

Turbine engines such as those used for aircraft have journal bearings in multiple locations, including those used to support rotating elements disposed in shaft bearing assemblies and fan drive gear systems. Interface surfaces of the journal bearings and the rotating elements they support must have sufficient hardness and resiliency to resist wear even under extreme combinations of pressure and velocity. One common wear interface surface for elements rotating about aircraft journal bearings is a magnetron-sputtered copper-lead alloy with a specialized microstructure. The manufacturing process of this alloy is complex and expensive, requiring specialized equipment.

Similar properties have not been previously available in silver-based coatings. Silver has been used previously to provide a low-friction surface for various alloys, but standard silver coatings have a relatively short useful life due to limited hardness and resilience properties. Thus they have not traditionally been useful for high performance applications requiring long service life and maintenance intervals over a wide variety of extreme operating conditions.

SUMMARY

An article comprises a metal alloy substrate and a plated wear interface layer disposed over a surface of the metal alloy substrate. The wear interface layer has a chemical composition including between about 0.005 wt % and about 0.050 wt % of antimony (Sb), and the balance silver (Ag) and incidental impurities.

A gear element comprises a gear body, a plurality of gear teeth distributed circumferentially around the gear body, and a plated wear interface layer. The wear interface layer is disposed over an inwardly facing gear surface. The wear interface layer has a chemical composition including between about 0.005 wt % and about 0.050 wt % of antimony (Sb), with the balance silver (Ag) and incidental impurities.

A method for providing a wear interface surface on a substrate comprises placing a surface of a substrate into a plating bath including silver cations ($Ag^{2+}$) and antimony cations ($Sb^{3+}$ and $Sb^{5+}$). A first plating current pulse is repeatedly applied through the plating bath to reduce a portion of the silver cations ($Ag^{2+}$) and the antimony cations ($Sb^{3+}$ and $Sb^{5+}$). The reduced cations form a wear interface surface layer on the substrate having a chemical composition including between about 0.005 wt % and about 0.050 wt % of antimony (Sb), with the balance silver (Ag) and incidental impurities.

DETAILED DESCRIPTION

Figure 1:
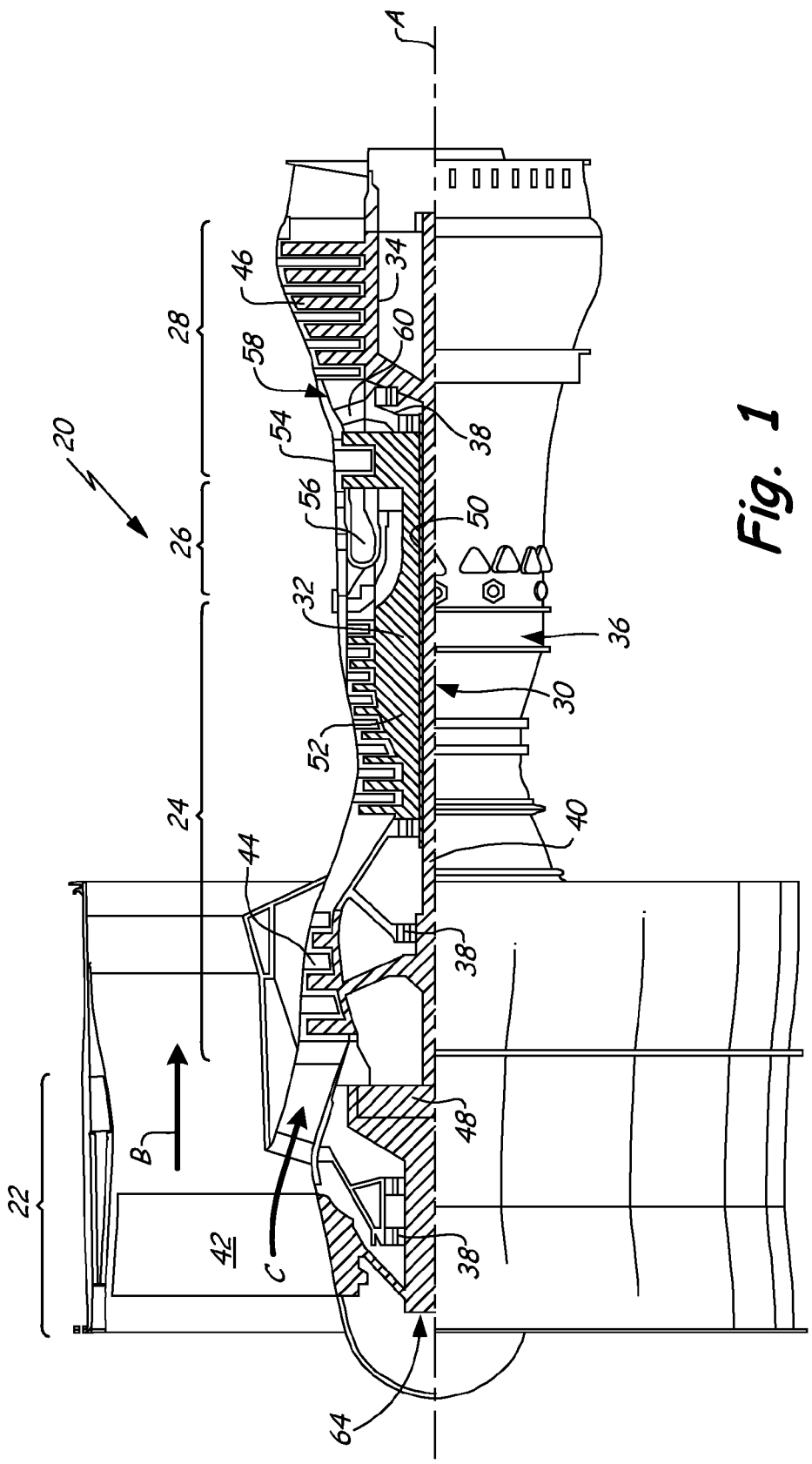
FIG. 1 schematically illustrates an example gas turbine engine.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis, and where a low spool enables a low pressure turbine to drive a fan directly, or via a gearbox, an intermediate spool that enables an intermediate pressure turbine to drive an intermediate compressor of the compressor section, and a high spool that enables a high pressure turbine to drive a high pressure compressor of the compressor section.

Engine 20 generally includes low speed spool 30 and high speed spool 32 mounted for rotation about an engine central longitudinal axis A relative to an engine static structure 36 via several bearing systems 38. Bearing systems 38 can each include one or more journal bearings with a coated lubricant surface. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 directly, or through a speed change device, such as geared architecture 48, to drive fan 42 (via fan shaft 64) at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3. An example epicyclical gear train with journal bearings is shown in subsequent figures.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ("TSFC")"—is an industry standard parameter of pound-mass ($lb_m$) of fuel per hour being burned divided by pound-force ($lb_f$) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(T_{ram}°R)/518.7]^{0.5}$. The "Low corrected fan tip speed", as disclosed herein according to one non-limiting embodiment, is less than about 1150 ft/second.

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
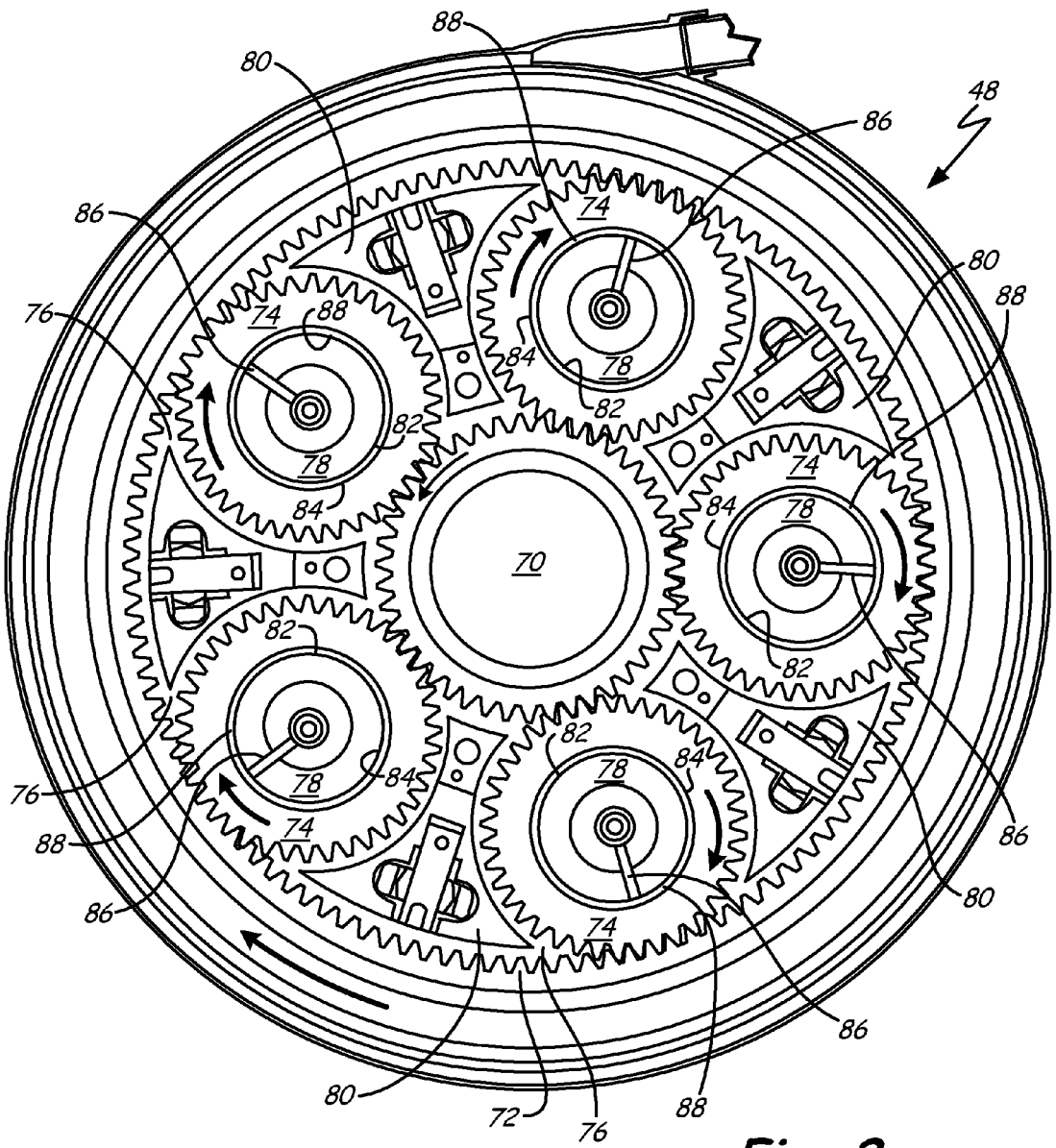
FIG. 2 is a diagrammatic view of an example epicyclic gear system.

FIG. 2 shows an example epicyclic gear train 48, and also includes sun gear 70, ring gear 72, star gears 74, gear carrier 76, journal bearings 78, oil baffles 80, journal bearing outer interface surfaces 82, star gear inner interface surfaces 84, radial supply passages 86, and distribution recesses 88.

In one example, geared architecture 48 is an epicyclic gear train with a stationary star gear carrier and rotatable ring gear. Epicyclic gear systems are complex mechanisms for reducing or increasing rotational speeds between two rotating shafts or rotors, such as between a low speed engine shaft and a fan drive shaft. The compactness of epicyclic gear trains makes them appealing for use in aircraft engines, but forces and torque transferred through the gear train place tremendous stresses on the components, making them susceptible to breakage and wear. Imperfect alignment of longitudinal gear axes with the input shaft necessitates increased amounts of lubrication to form an adequate film thickness between each journal bearing and interfacing gears than would otherwise be necessary and reduce the amount of wear experienced particularly by the journal bearing and interfacing gears. Surfaces of the gears interfacing with journal bearings can be provided with a hardened silver-based coating or interface layer to provide a balance of lubrication, reduced friction, strength, and low cost as described below.

Figure 3:
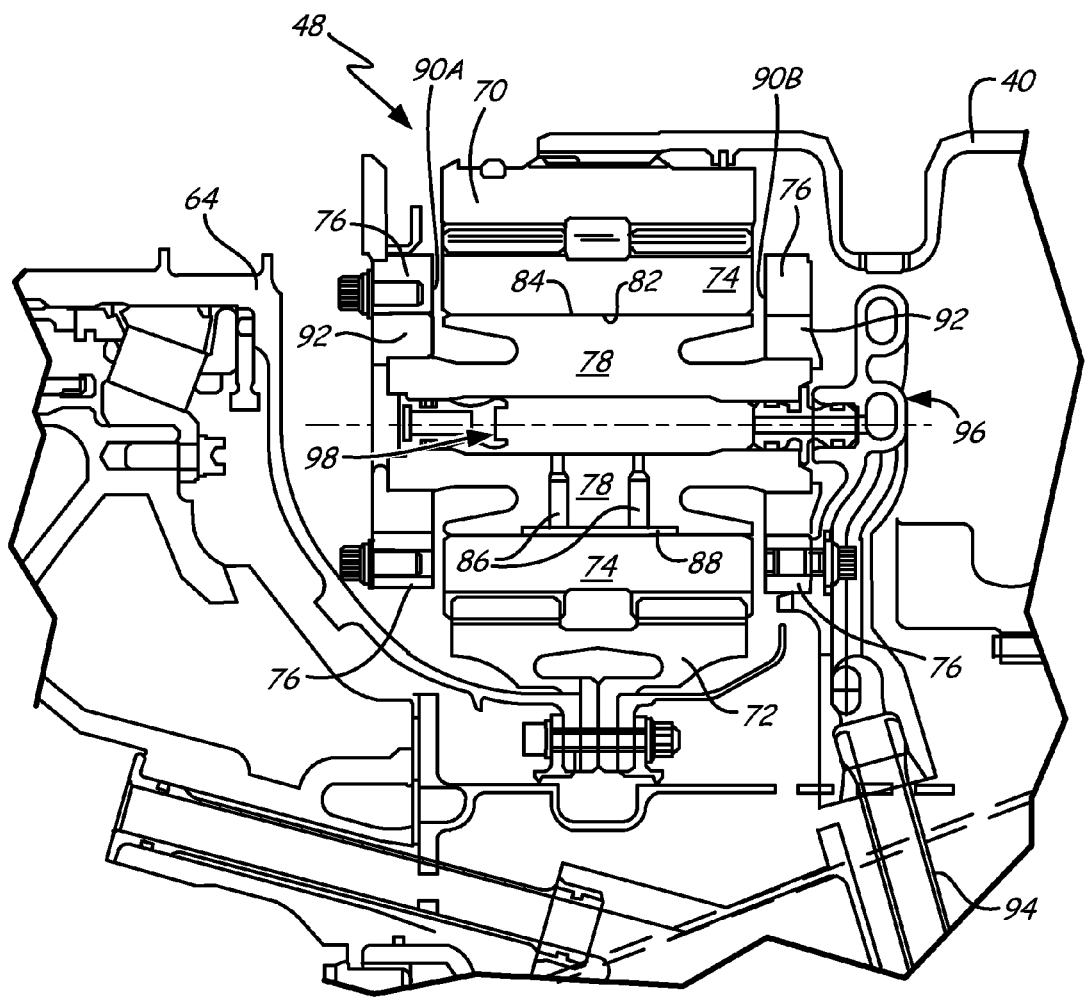
FIG. 3 is a schematic cross-sectional view through a portion of the example epicyclic gear system.

Here, sun gear 70 is rotatably mounted to inner (low pressure) shaft 40 (shown in FIG. 3). Fan shaft 64 (also shown in FIG. 3) is driven at a lower speed than inner shaft 40 via ring gear 72, which turns fan 42 (shown in FIG. 1). Star gears 74 include a plurality of circumferentially distributed gear teeth, and are enmeshed between sun gear 70 and ring gear 72 such that star gears 74 rotate when sun gear 70 rotates. Star gears 74 can include a gear body rotatably mounted on stationary gear carrier 76 by stationary journal bearings 78. When low speed spool 30 (shown in FIG. 1) rotates, epicyclic gear train 48 therefore causes the fan to rotate at a slower rotational velocity than that of low speed spool 30, but in the opposite direction.

In an alternative embodiment, geared architecture 48 may be an epicyclic gear train configured with a rotatable star gear carrier 76 and a fixed ring gear 72. This is sometimes called a planetary gear system. In this alternative configuration, star or "planet" gears 74 are rotatably mounted on gear carrier 76 by journal bearings 78. Baffles or spray bars 80 can be provided to help distribute lubricant through the interfacing gears. Star gears 74 mesh with sun gear 70 and mechanically grounded ring gear 72. Input and output shafts (not shown) extend from sun gear 70 and star gear carrier 76 respectively. During operation, the input shaft, such as low speed shaft 40, rotatably drives sun gear 70, thereby driving star gears 74 and causing them to orbit sun gear 70 in the manner of a planet, which turns the gear carrier and the output shaft in the same direction as the input shaft. The operation of similar examples of epicyclic gear systems and lubrication systems for epicyclic gear systems are further detailed in commonly assigned U.S. Pat. Nos. 6,223,616 and 5,102,379, which are herein incorporated by reference.

In this example, each journal bearing 78 includes outer surface 82 which interfaces with respective star gear inner surface 84. Lubricant flows through radial supply passages 86 into distribution recess 88 to form a load supporting lubricant film between journal bearing 78 and star gear 74. The lubricant film is discharged from axial extremities of the bearing interface, most of which is directed into the sun/star mesh, aided by nearby baffles 80. The directed lubricant cools and lubricates the sun and star gear teeth and then is expelled from the sun/star mesh. The adjacent baffle 80 then guides substantially all of the expelled lubricant radially outwardly into the star/ring mesh before being ejected and centrifugally channeled away from epicyclic gear system 48. In one embodiment, the flow rate of lubricant provides journal bearing interface surface 82 with a minimum lubricant film thickness of between about 2.5 μm (about 100 micro inches) and 51 μm (about 2000 micro inches).

Star gear inner surface 84 is worn by journal bearing outer interface surface 82, such that star gear inner surface 84 conforms to outer interface surface 82 for controlling friction therebetween. Journal bearing outer interface surface 82 may optionally be finished to achieve a fine surface roughness in order to minimize uneven wear on the softer star gear inner surface 84. One suitable, non-limiting example of a finished journal bearing interface surface for an epicyclic gear system is described in commonly assigned U.S. Pat. No. 8,172,716, which is herein incorporated by reference.

Star gear inner surface 84 can include a wear interface layer disposed over a surface of star gear 74 such as an inner diameter surface configured to face journal bearing 78. The wear interface layer can be plated directly onto star gear 74. Alternatively, star gear inner surface 84 can be plated onto a separate replaceable liner fitting annularly between journal bearing 78 and star gear 74. In any case, inner surface 84 includes a plated wear interface layer comprising a silver alloy. The interface layer can be pulse-plated by periodically applying plating current pulses through a silver plating bath having small amounts of antimony. This combination of pulse-plating voltage and controlling antimony composition of the interface layer can cooperate to enhance grain dimension control and hardness properties as described below.

FIG. 3 shows a cross-section of engine 20 proximate epicyclic gear system 48. FIG. 3 also includes fan shaft 64 sun gear 70, ring gear 72, star gears 74, gear carrier 76, journal bearings 78, journal bearing outer interface surfaces 82, star gear inner interface surfaces 84, radial supply passage 86, distribution recess 88, gear carrier faces 90A, 90B, end caps 92, lubricant feed tube 94, manifold 96, and axial supply passage 98.

As described previously, star gear carrier 76 is stationarily mounted within gas turbine engine 20 to at least one non-rotating engine case wall (not shown) disposed radially outward from epicyclic gear system 48. Carrier 76 has two generally interfacing faces 90A, 90B which support the ends of stationary journal bearing 78. In the example embodiment shown in FIGS. 2 and 3, stationary journal bearing 78 is positioned inside of rotatable star gear 74. End caps 92 are welded or otherwise affixed to journal bearing 78 and press fit into carrier 76 to provide support for journal bearing 78. Fasteners extend through end caps 92 and connect to carrier 76 to act as an anti-rotation feature to keep journal bearing 78 stationary. Lubricant feed tube 94 feeds pressurized lubricant to manifold 96, which is fluidly connected to journal bearing 78 via axial supply passage 98 and radial supply passage 86.

Main body portions of star gears 74 and journal bearings 78 are typically made of steel. Commonly used steel grades include case-hardenable AMS 6265 and AMS 6308. AMS 6265 is a nickel-chromium based steel. AMS 6308 includes molybdenum and vanadium to increase toughness. In certain embodiments, journal bearing outer interface surfaces 82 are carburized, then smoothed or super-finished to remove larger asperities and achieve an amorphous surface roughness. While softer than journal bearing outer interface surface 82, star gear inner surfaces 84 should have sufficient hardness and resilience to withstand a damaging combination of unit loading and linear sliding velocity which may exceed about 20 MPa (about 2900 psig), and about 50 m/sec (about 165 ft/sec) respectively.

Star gear inner surfaces 84 can include a low-friction journal interface surface layer having a chemical composition between about 0.005 wt % and about 0.050 wt % of antimony (Sb), with the balance silver (Ag) and incidental impurities. In certain embodiments, the interface layer includes between about 0.010 wt % Sb and about 0.035 wt % Sb. In certain of those embodiments, the interface layer includes between about 0.015 wt % Sb and about 0.025 wt % Sb.

Previous star gear interfaces have been provided with a wear interface coating or liner comprising a low-friction copper-lead alloy. However, the process to make such a coating with the correct composition and microstructure is complex, requires specialized equipment, and is thus expensive and difficult to scale up. In contrast, silver coating materials and processes are much simpler to handle and use, and silver is readily electroplated onto a variety of substrates. However, previous silver coatings do not possess the hardness and resiliency required in harsh operating environments, such as for an interface surface contacting a journal bearing.

In substantially pure silver microstructures, small amounts of antimony operate as a grain dimension reducer. Reducing silver grain size effectively increases the hardness, strength, and resiliency of the applied silver while maintaining a low frictional coefficient for use as a wear interface surface layer. Grain dimension of the applied wear interface layer can be further reduced by controlling the electroplating process with pulsed plating voltages as described below. In certain embodiments, the silver interface layer has a microstructure with an average grain dimension of less than about 10 nm. In certain of those embodiments, the microstructure has an average grain dimension of less than about 5 nm. Depending on the exact process parameters, the wear interface layer includes a hardness value measuring at least about 150 on the Vickers scale. This hardness value is comparable to the previously described copper-lead alloy and larger than previously known silver-based wear interfaces. To achieve a silver-based wear interface layer with some or all of these properties, the wear interface surface can be pulse-plated from an Ag/Sb plating bath onto a surface of a substrate. The substrate may be an article such as star gear 74 or onto a separate liner as described above. Examples of pulse-plating are described with respect to FIG. 4.

While the example wear interface surface is described with reference to journal bearing surfaces for epicyclic gears, it will be appreciated that the described subject matter can be readily adapted to other silver-based coating processes and articles. For example, the journal bearing and star gear substrates were previously described as steel alloys. It will be recognized that the metal alloy substrate can alternatively be a number of other substrates such as a superalloy comprising nickel or cobalt.

Figure 4:
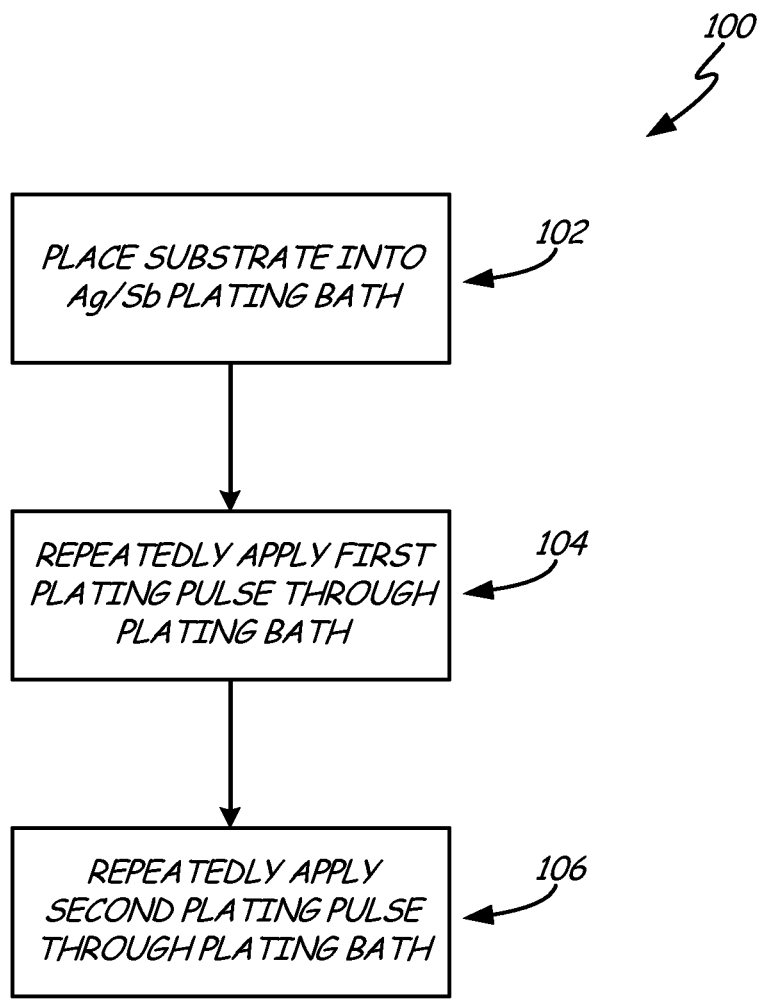
FIG. 4 is a chart describing a process for coating an article such as a surface of a gear for an epicyclic gear system.

FIG. 4 is a flow chart depicting steps of example method 100 for providing a wear interface surface on an article. The method can be used to provide one or more wear interface surface layers on a rotatable article such as a gear element that is configured to interface and rotate about a journal bearing. Step 102 describes placing a substrate into a silver-based electroplating bath. The bath includes silver cations ($Ag^{2+}$) and antimony cations ($Sb^{3+}$ and/or $Sb^{5+}$). Silver cations ($Ag^{2+}$) can be provided by any suitable ionic composition such as but not limited to silver halide salts. Antimony cations ($Sb^{3+}$ and/or $Sb^{5+}$) can be added to an otherwise standard silver plating bath via commercially available silver brightening additives, examples of which include hydrates of antimony-containing alkali metal salts and/or ammonium salts. One suitable, non-limiting example of an antimony additive is potassium antimonyl tartrate. Generally, the relative ratio of silver and antimony cations in the plating bath will be similar to the desired composition in the finished interface. However, the exact additive and composition of the plating bath will vary based on the process conditions.

Step 104 includes repeatedly applying a first plating current pulse through the electroplating bath to reduce and deposit silver cations ($Ag^{2+}$) and the antimony cations ($Sb^{3+}$ and/or $Sb^{5+}$) from the plating bath onto a surface of the substrate. Step 104 can be performed, for example, by applying discrete electric pulses through the plating bath using any suitable control apparatus. Repeated pulses may each be applied for a substantially constant first time duration, and separated by a substantially constant second time duration. The first time duration, which may be less than 1.0 millisecond (ms), can optionally be equal to the second time duration.

In certain of these embodiments, the first time duration of each of the first plating pulses can be less than about 0.5 ms. In certain of these embodiments, the applied plating voltage and current are effectively zero between pulses. In one example, the first nonzero plating pulse is applied for a first time duration of about 0.1 ms with a 0.1 ms second time duration between pulses, resulting in an overall plating duty cycle of the first nonzero plating voltage being at least about 50%.

Step 106 shows an optional step of periodically applying a second plating current for a second time duration. This may be the second time duration between the first nonzero plating voltages of step 104. In certain embodiments, a polarity of the second plating current can be the same as a polarity of the first plating current, but with a different magnitude. Alternatively, the second plating current can have a different voltage and/or an opposite polarity as compared to the first plating current. In another example embodiment, the first time duration of the first plating current pulse about 0.2 ms and the second time duration between first plating pulses is about 0.4 ms. Second current pulses may be applied during some or all of the 0.4 ms second time duration.

In combination with the alloy composition, pulse plating results in a silver-based wear interface surface layer with repeatable nanometer scale grain sizes and increased hardness properties. The resulting pulse-plated wear interface surface has between about 0.005 wt % and about 0.050 wt % of antimony (Sb), with the balance silver (Ag) and incidental impurities. In certain embodiments the resulting wear interface surface has between about 0.010 wt % and about 0.035 wt % of antimony (Sb). In certain of those embodiments, the resulting wear interface surface has between about 0.015 wt % and about 0.025 wt % of antimony (Sb).

It was found that adding small amounts of antimony to otherwise substantially pure silver, in combination with the pulse plating process can result in a hardened low-friction silver layer with controlled grain dimensions. The combined effects of antimony composition with sub-millisecond pulse plating has been found to provide a simple silver plating process with tight control and repeatability of nanometer-scale grains and high hardness properties, as compared to either factor alone. As noted above, embodiments of the process can result in a wear interface with a hardened silver microstructure having an average grain dimension of less than about 10 nm. In certain embodiments, the resulting microstructure can have an average grain dimension of less than about 5 nm. Resulting wear interface surface layers can have a hardness value measuring at least about 150 on the Vickers scale.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present disclosure.

An article comprises a metal alloy substrate and a plated wear interface layer disposed over a surface of the metal alloy substrate. The plated wear interface layer has a chemical composition including between about 0.005 wt % and about 0.050 wt % of antimony (Sb), and the balance silver (Ag) and incidental impurities.

The article of the preceding paragraph can optionally include, additionally and/or alternatively, any one or more of the following features, configurations and/or additional components:

An article according to an exemplary embodiment of this disclosure, among other possible things, includes a metal alloy substrate with a plated wear interface layer disposed over a surface of the metal alloy substrate. The wear interface layer has a chemical composition including between about 0.005 wt % and about 0.050 wt % of antimony (Sb), and the balance silver (Ag) and incidental impurities.

A further embodiment of the foregoing article, wherein the wear interface layer additionally and/or alternatively includes a microstructure having an average grain dimension of less than about 10 nm.

A further embodiment of any of the foregoing articles, wherein the microstructure additionally and/or alternatively has an average grain dimension of less than about 5 nm.

A further embodiment of any of the foregoing articles, wherein the wear interface layer additionally and/or alternatively includes a hardness value measuring at least about 150 on the Vickers scale.

A further embodiment of any of the foregoing articles, wherein the metal alloy substrate additionally and/or alternatively comprises case-hardenable steel.

A further embodiment of any of the foregoing articles, wherein the wear interface layer additionally and/or alternatively is an inner surface of the article and is configured to rotate about a journal bearing.

A further embodiment of any of the foregoing articles, wherein the article is a component for an epicyclic gear system.

A further embodiment of any of the foregoing articles, wherein the chemical composition additionally and/or alternatively includes between about 0.015 wt % and about 0.025 wt % of antimony (Sb).

A gear element comprises a gear body, a plurality of gear teeth distributed circumferentially around the gear body, and a plated wear interface layer disposed over an inwardly facing gear surface.

The gear element of the preceding paragraph can optionally include, additionally and/or alternatively, any one or more of the following features, configurations and/or additional components:

A gear element according to an exemplary embodiment of this disclosure, among other possible things, includes a gear body, a plurality of gear teeth distributed circumferentially around the gear body, and a plated wear interface layer disposed over an inwardly facing gear surface. The plated wear interface layer has a chemical composition including between about 0.005 wt % and about 0.050 wt % of antimony (Sb), with the balance silver (Ag) and incidental impurities.

A further embodiment of the foregoing gear element, wherein the chemical composition additionally and/or alternatively includes between about 0.010 wt % and about 0.035 wt % of antimony (Sb).

A further embodiment of any of the foregoing gear elements, wherein the chemical composition additionally and/or alternatively includes between about 0.015 wt % and about 0.025 wt % of antimony (Sb).

A further embodiment of any of the foregoing gear elements, wherein the bearing interface coating layer additionally and/or alternatively includes a microstructure having an average grain dimension of less than about 10 nm, and a hardness value measuring at least about 150 on the Vickers scale.

A further embodiment of any of the foregoing gear elements, wherein the gear body additionally and/or alternatively comprises case-hardenable steel.

A further embodiment of any of the foregoing gear elements, wherein the gear body additionally and/or alternatively is either a star gear or a planetary gear for an epicyclic gear system.

A further embodiment of any of the foregoing gear elements, wherein the epicyclic gear system is a fan drive gear system for a gas turbine engine.

A method for coating an article comprises placing a surface of a substrate into a plating bath including silver cations ($Ag^{2+}$) and antimony cations ($Sb^{3+}$ and $Sb^{5+}$) and repeatedly applying a first plating current pulse through the plating bath.

The method of the preceding paragraph can optionally include, additionally and/or alternatively, any one or more of the following features, configurations and/or additional components:

A method for coating a substrate according to an exemplary embodiment of this disclosure, among other possible things, includes placing a surface of the substrate into a plating bath including silver cations ($Ag^{2+}$) and antimony cations ($Sb^{3+}$ and $Sb^{5+}$) and repeatedly applying a first plating current pulse through the plating bath to reduce a portion of the silver cations ($Ag^{2+}$) and the antimony cations ($Sb^{3+}$ and $Sb^{5+}$). The reduced cations form a coating layer having a chemical composition including between about 0.005 wt % and about 0.050 wt % of antimony metal (Sb), with the balance silver (Ag) metal and incidental impurities.

A further embodiment of the foregoing method, wherein additionally and/or alternatively, the repeated first pulses are each applied for a substantially constant first time duration.

A further embodiment of any of the foregoing methods, wherein additionally and/or alternatively, the first time duration is less than about 1.0 millisecond (ms).

A further embodiment of any of the foregoing methods, wherein additionally and/or alternatively, a second plating current pulse is repeatedly applies through the plating bath, with each second current pulse applied for a second time duration.

A further embodiment of any of the foregoing methods, wherein additionally and/or alternatively, the first time duration is substantially equal to the second time duration.

A further embodiment of any of the foregoing methods, wherein additionally and/or alternatively, the first plating current pulse is applied with a first polarity, and the second plating current pulse is applied with a second polarity, the second polarity being opposite the first polarity.

A further embodiment of any of the foregoing methods, wherein additionally and/or alternatively, the resulting coating includes a microstructure having an average grain dimension of less than about 10 nm.

A further embodiment of any of the foregoing methods, wherein additionally and/or alternatively, the resulting coating includes a hardness value measuring at least about 150 on the Vickers scale.

The invention claimed is:

1. An article comprising:
   a metal alloy substrate comprising case-hardenable steel; and
   a plated wear interface layer disposed over a surface of the metal alloy substrate, the plated wear interface layer having a chemical composition including between about 0.005 wt % and about 0.050 wt % of antimony (Sb), and the balance silver (Ag) and incidental impurities.

2. The article of claim 1, wherein the wear interface layer includes a microstructure having an average grain dimension of less than about 10 nm.

3. The article of claim 2, wherein the microstructure has an average grain dimension of less than about 5 nm.

4. The article of claim 1, wherein the wear interface layer includes a hardness value measuring at least about 150 on the Vickers scale.

5. The article of claim 1, wherein the article is a component for an epicyclic gear system.

6. The article of claim 1, wherein the chemical composition includes between about 0.015 wt % and about 0.025 wt % of antimony (Sb).

7. A gear element comprising:
   a gear body;
   a plurality of gear teeth distributed circumferentially around the gear body; and
   a plated wear interface layer disposed over an inwardly facing gear surface, the plated wear interface layer having a chemical composition including between about 0.005 wt % and about 0.050 wt % of antimony (Sb), with the balance silver (Ag) and incidental impurities.

8. The gear element of claim 7, wherein the chemical composition includes between about 0.010 wt % and about 0.035 wt % of antimony (Sb).

9. The gear element of claim 8, wherein the chemical composition includes between about 0.015 wt % and about 0.025 wt % of antimony (Sb).

10. The gear element of claim 7, wherein the wear interface layer includes a microstructure having an average grain dimension of less than about 10 nm, and a hardness value measuring at least about 150 on the Vickers scale.

11. The gear element of claim 7, wherein the gear element is either a star gear or a planetary gear for an epicyclic gear system.

12. The gear element of claim 11, wherein the epicyclic gear system is a fan drive gear system for a gas turbine engine.

13. An article comprising:
   a metal alloy substrate; and
   a plated wear interface layer disposed over a surface of the metal alloy substrate, the plated wear interface layer having a chemical composition including between about 0.005 wt % and about 0.050 wt % of antimony (Sb), and the balance silver (Ag) and incidental impurities;
   wherein the wear interface layer is an inner surface of the article and is configured to rotate about a journal bearing.

14. The article of claim 13, wherein the wear interface layer includes a microstructure having an average grain dimension of less than about 10 nm.

15. The article of claim 14, wherein the microstructure has an average grain dimension of less than about 5 nm.

16. The article of claim 13, wherein the wear interface layer includes a hardness value measuring at least about 150 on the Vickers scale.

17. The article of claim 13, wherein the article is a component for an epicyclic gear system.

18. The article of claim 17, wherein the component is either a star gear or a planetary gear for the epicyclic gear system.

19. The article of claim 17, wherein the epicyclic gear system is a fan drive gear system for a gas turbine engine.

20. The article of claim 13, wherein the chemical composition includes between about 0.015 wt % and about 0.025 wt % of antimony (Sb).

* * * * *